United States Patent
Wollman et al.

(10) Patent No.: US 10,862,750 B2
(45) Date of Patent: Dec. 8, 2020

(54) NETWORK CONFIGURATION APPARATUS

(71) Applicant: TD Ameritrade IP Company, Inc., Omaha, NE (US)

(72) Inventors: William Victor Wollman, Oceanport, NJ (US); Donald Robert Steinmetz, Jr., Mountainside, NJ (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 58 days.

(21) Appl. No.: 16/371,059

(22) Filed: Mar. 31, 2019

(65) Prior Publication Data
US 2020/0313965 A1     Oct. 1, 2020

(51) Int. Cl.
*H04L 12/24*     (2006.01)
*H04L 12/26*     (2006.01)
*H04L 29/12*     (2006.01)

(52) U.S. Cl.
CPC .......... *H04L 41/0816* (2013.01); *H04L 41/06* (2013.01); *H04L 41/0866* (2013.01); *H04L 43/12* (2013.01); *H04L 43/14* (2013.01); *H04L 61/25* (2013.01)

(58) Field of Classification Search
CPC . H04L 41/0816; H04L 41/0866; H04L 41/06; H04L 43/12; H04L 43/14; H04L 61/25; H04L 63/10; H04L 63/14
See application file for complete search history.

(56) References Cited

U.S. PATENT DOCUMENTS

| | | | | |
|---|---|---|---|---|
| 7,680,822 | B1 * | 3/2010 | Vyas | G06F 21/604 707/781 |
| 8,462,619 | B2 * | 6/2013 | Clemens | H04L 41/0681 370/216 |
| 9,432,335 | B1 * | 8/2016 | Stevenson | H04L 63/08 |
| 2013/0152187 | A1 * | 6/2013 | Strebe | H04L 63/101 726/11 |
| 2015/0067816 | A1 * | 3/2015 | Rados | H04L 63/20 726/11 |

(Continued)

OTHER PUBLICATIONS

Tufin Frequently Asked Questions; Jan. 30, 2019; 6 pages.
Tufin Technologies; SecureTrack REST API Documentation; Jan. 30, 2019; 21 pages.

*Primary Examiner* — Michael A Keller
*Assistant Examiner* — Jsing Forng Lin
(74) *Attorney, Agent, or Firm* — Harness, Dickey & Pierce, P.L.C.

(57) ABSTRACT

A network configuration apparatus includes a user interface module configured to receive a traffic request from a user. The traffic request includes a source and a destination for desired traffic. A barrier identification module obtains network data indicating a set of networking devices present in a route between the source and the destination. For each of the devices, the barrier identification module determines whether the device may block traffic from reaching the destination and, if so, adds the device to a set of potential barriers. A route analysis module, for each device of the potential barriers, flags the device if it will block the desired traffic. The user interface module, in response to there being at least one flagged device, transmits an alert that the traffic request is a failure; and, in response to there being zero flagged devices, transmits an alert that the traffic request is a success.

20 Claims, 7 Drawing Sheets

(56) References Cited

U.S. PATENT DOCUMENTS

| | | | |
|---|---|---|---|
| 2015/0134822 A1* | 5/2015 | Bhagwat | H04L 41/0803 |
| | | | 709/226 |
| 2016/0261611 A1* | 9/2016 | Heilig | H04L 63/1425 |
| 2019/0068650 A1* | 2/2019 | Castel | H04L 12/40 |
| 2019/0141015 A1* | 5/2019 | Nellen | H04L 61/1511 |
| 2019/0182213 A1* | 6/2019 | Saavedra | H04L 63/0263 |
| 2020/0125758 A1* | 4/2020 | Xie | G06F 21/6209 |

* cited by examiner

NETWORK CONFIGURATION APPARATUS

FIELD

The present disclosure relates to systems and method for configuring computer networking equipment and more particularly to identifying and reconfiguring network security chokepoints.

BACKGROUND

Middleboxes are networking devices that can transform packets beyond simply performing packet forwarding. Middleboxes include firewalls and routers with access control lists, provide network security by placing a barrier between zones of trust, such as between a trusted inside network and an untrusted outside network. Middleboxes can be arranged to provide layers of protection around sensitive proprietary information, such as client data. Middleboxes can also perform functions such as network address translation (NAT), which may have security as well as IP address space efficiency benefits.

Middleboxes are generally configured by a network administrator to block unwanted inbound and outbound traffic. However, these configurations sometimes block legitimate traffic, especially traffic created by new software and services. For example, a software developer may be prevented from deploying a new application or a new feature of an existing application because of the configuration of the middleboxes.

Larger networks, such as enterprise networks, generally have more complicated network infrastructures and are therefore even more likely to prevent the easy roll-out of new software that requires network access. Even if the software developer is very knowledgeable about networks, investigating network configurations may be time-consuming or even impossible, such as if the software developer does not have sufficient access rights to inspect network configuration data.

As a result, software development and deployment may require the assistance of one or more network engineers. The expense and delay of requiring the participation of network engineers may cause software developers to shun creating new features they fear might require networking changes. These incentives are particularly problematic for companies that rely on rapid innovation.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A network configuration apparatus includes a user interface module configured to receive a traffic request from a user. The traffic request includes a source and a destination for desired traffic. The network configuration apparatus includes a barrier identification module configured to obtain network data indicating a set of networking devices present in a route between the source and the destination and, for each device of the set of networking devices, determine whether the device may block traffic from reaching the destination and, if so, add the device to a set of potential barriers. The network configuration apparatus includes a route analysis module configured to, for each device in the set of potential barriers, evaluate whether the device will block the desired traffic from reaching the destination and, if so, flag the device. The user interface module is configured to, in response to there being at least one flagged device, transmit an alert to the user that the traffic request is a failure; and, in response to there being zero flagged devices, transmit an alert to the user that the traffic request is a success.

In other features, the network configuration apparatus includes a change module configured to, in response to there being at least one flagged device, generate a change request specifying at least one of the at least one flagged device. In other features, the change module is configured to, in response to generation of the change request, automatically transmit the change request to a network administrator. In other features, generating the change request for multiple flagged devices includes one of generating an individual change request for each of the flagged devices and generating a single change request specifying all of the flagged devices.

In other features, the network data includes, for a first device of the set of networking devices, a name of the first device. The barrier identification module is configured to determine that the first device may block traffic from reaching the destination based on the name of the first device. In other features, the network data includes, for a first device of the set of networking devices, a ruleset. The route analysis module is configured to determine whether the first device will block the desired traffic from reaching the destination by evaluating the ruleset with respect to parameters of the desired traffic. The parameters of the desired traffic include the destination.

In other features, the parameters of the desired traffic include two or more of (i) a port number, (ii) a protocol selection, and (iii) an application name. In other features, the barrier identification module is configured to obtain the network data from a network monitoring system. The network data also includes a determination by the network monitoring system of whether the desired traffic is permitted between the source and the destination.

In other features, the determination from the network monitoring system includes either (i) a success value indicating that the desired traffic is permitted between the source and the destination or (ii) a failure value indicating that the desired traffic is blocked by at least one of the set of networking devices. The user interface module is configured to, in response to the determination including the success value but there being at least one flagged device, transmit an alert to the user that a discrepancy has been identified with respect to the traffic request. The user interface module is configured to, in response to the determination including the failure value but there being zero flagged devices, transmit an alert to the user that a discrepancy has been identified with respect to the traffic request.

In other features, the traffic request specifies traffic parameters. The traffic parameters include at least two of (i) a port number, (ii) a protocol selection, and (iii) an application name. In other features, the traffic request includes at least one source, at least one destination, at least one port number, and at least one protocol selection.

In other features, the barrier identification module is configured to, for each device of the set of network devices, determine whether the device is configured to perform network address translation (NAT) on the desired traffic and, if so, add the device to the set of potential barriers. In other features, the user interface module is configured to receive a plurality of traffic requests. The route analysis module is configured to make a determination for each of the plurality of traffic requests as to whether traffic is permitted.

A method includes receiving a traffic request from a user. The traffic request includes a source and a destination for desired traffic. The method includes obtaining network data indicating a set of networking devices present in a route between the source and the destination. The method includes determining, for each device of the set of networking devices, whether the device may block traffic from reaching the destination and, if so, adding the device to a set of potential barriers. The method includes evaluating, for each device in the set of potential barriers, whether the device will block the desired traffic from reaching the destination and, if so, flag the device. The method includes, in response to there being at least one flagged device, transmitting an alert to the user that the traffic request is a failure. The method includes, in response to there being zero flagged devices, transmitting an alert to the user that the traffic request is a success.

In other features, the method includes, in response to there being at least one flagged device, generating a change request specifying at least one of the at least one flagged device and transmitting the change request to a network administrator. Generating the change request includes one of generating an individual change request for each of the flagged devices, and generating a single change request specifying all of the flagged devices.

In other features, the network data includes, for a first device of the set of networking devices, a ruleset. The method includes determining whether the first device will block the desired traffic from reaching the destination by evaluating the ruleset with respect to parameters of the desired traffic. The parameters of the desired traffic include the destination. In other features, the method includes obtaining the network data from a network monitoring system. The network data also includes a determination by the network monitoring system of whether the desired traffic is permitted between the source and the destination.

In other features, the determination from the network monitoring system includes either (i) a success value indicating that the desired traffic is permitted between the source and the destination or (ii) a failure value indicating that the desired traffic is blocked by at least one of the set of networking devices. The method further includes, in response to the determination including the success value but there being at least one flagged device, transmitting an alert to the user that a discrepancy has been identified with respect to the traffic request. The method includes, in response to the determination including the failure value but there being zero flagged devices, transmitting an alert to the user that a discrepancy has been identified with respect to the traffic request.

In other features, the method includes, for each device of the set of network devices, determining whether the device is configured to perform network address translation (NAT) on the desired traffic and, if so, adding the device to the set of potential barriers.

A non-transitory computer-readable medium stores processor-executable instructions. The instructions include receiving a traffic request from a user. The traffic request includes a source and a destination for desired traffic. The instructions include obtaining network data indicating a set of networking devices present in a route between the source and the destination. The instructions include determining, for each device of the set of networking devices, whether the device may block traffic from reaching the destination and, if so, adding the device to a set of potential barriers. The instructions include evaluating, for each device in the set of potential barriers, whether the device will block the desired traffic from reaching the destination and, if so, flag the device. The instructions include, in response to there being at least one flagged device, transmitting an alert to the user that the traffic request is a failure. The instructions include, in response to there being zero flagged devices, transmitting an alert to the user that the traffic request is a success.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
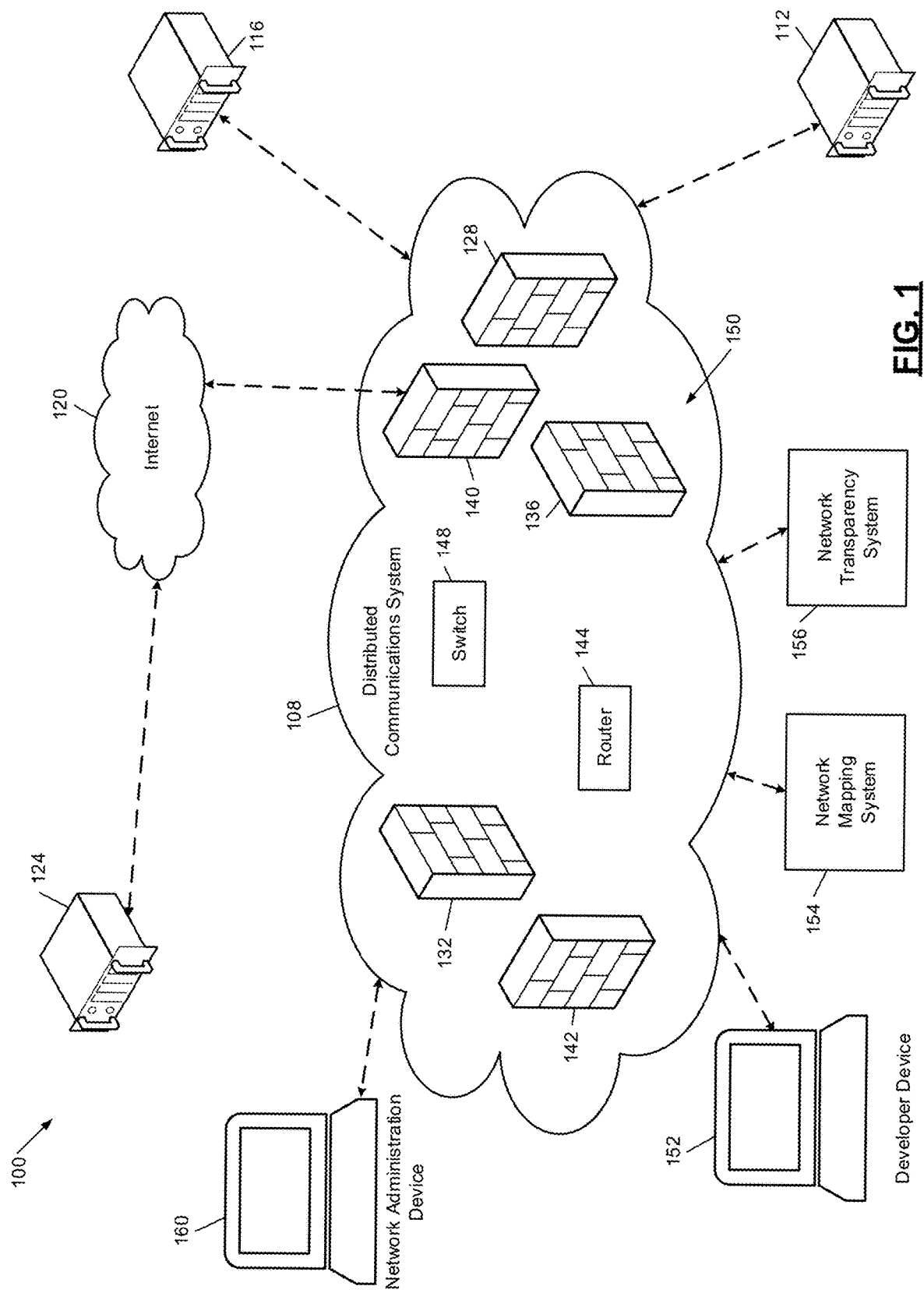
FIG. 1 is a functional block diagram of an example network environment including a network transparency system according to the principles of the present disclosure.

In FIG. 1, an example network environment 100 includes a distributed communications system 108. The distributed communications system 108 allows endpoints to exchange traffic with each other. For example, the network endpoints include servers 112 and 116 and, connected to the distributed communications system 108 via Internet 120, server 124.

The distributed communications system 108 includes networking devices such as firewalls 128, 132, 136, 140, and 142, router 144, and switch 148 (collectively referred to as networking devices 150). Networking protocols used in the distributed communications system 108 may include multi-protocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the distributed communications system 108 may be represented using technologies and/or formats including JavaScript object notation (JSON), hypertext markup language (HTML), extensible markup language (XML), etc. In addition, some links may be encrypted using encryption technologies such as transport layer security (TLS), virtual private networks (VPNs), Internet Protocol security (IPsec), etc.

A developer device 152 may be used by a developer to develop or deploy software that relies on one or more endpoints, such as the servers 112, 116, and 124. Some traffic between the servers 112, 116, and 124 may be prohibited by one or more of the networking devices 150 that act as middleboxes. For example, one or more of the networking devices 150 may include rules that allow or deny inbound and outbound traffic. In this disclosure, the term "rules" encompasses other access control structures, such as access control lists (ACLs).

In one situation, one of the networking devices 150 may be configured to allow all traffic except for traffic that is explicitly denied. One of the deny rules may affect traffic flows needed by the developer. In another situation, one of the networking devices 150 may be configured to deny all network traffic except for traffic that is explicitly allowed. The traffic flows needed by the developer may not be included in any of the explicit rules.

A network mapping system 154 (also referred to as a network monitoring system) monitors network configuration parameters for the networking devices 150. For example, the network mapping system 154 may periodically (such as once per day) retrieve configuration data from each of the networking devices 150. In other implementations, the network mapping system 154 may retrieve configuration data regarding the networking devices 150 from a central configuration server (not shown), which may be responsible for deploying configurations to the networking devices 150. The network mapping system 154 may include an application such as a firewall enterprise management system. One example of a firewall enterprise management system is the SecureTrack application provided as part of the Tufin Orchestration Suite™ from Tufin Software North America, Inc.

When the developer is deploying software to the network environment 100, the developer can investigate whether traffic will be allowed by consulting a network transparency system 156. For example, using developer device 152, the developer may submit a desired route to the network transparency system 156. The route may specify endpoints and traffic parameters, such as a protocol and a port number.

The network transparency system 156 determines whether or not the specified traffic will be allowed between the endpoints according to the configuration of the distributed communications system 108, which may be obtained from the network mapping system 154. In various implementations, the network mapping system 154 may provide network data regarding routes and configuration parameters in a format such as JSON or XML.

The network transparency system 156 provides an indication to the developer device 152 regarding whether traffic is allowed and may also provide details regarding which of the networking devices 150 are encountered in the specified route. The network transparency system 156 may further identify which of the networking devices 150 are preventing the desired traffic.

Once the developer knows which of the networking devices 150 are preventing the desired traffic, the developer can consult with a network engineer, such as by submitting a request to a network administration device 160, to permit the traffic. Larger organizations may have a defined process for requesting traffic. This process may provide for a developer to submit a change request to a change request system (and/or to the network administration device 160) specifying the desired traffic and the networking devices that need reconfiguration to permit the desired traffic. In various implementations, the network transparency system 156 may be configured to automate the generation and submission of change requests on behalf of the developer based on which of the networking devices 150 are preventing the desired traffic.

Figure 2:
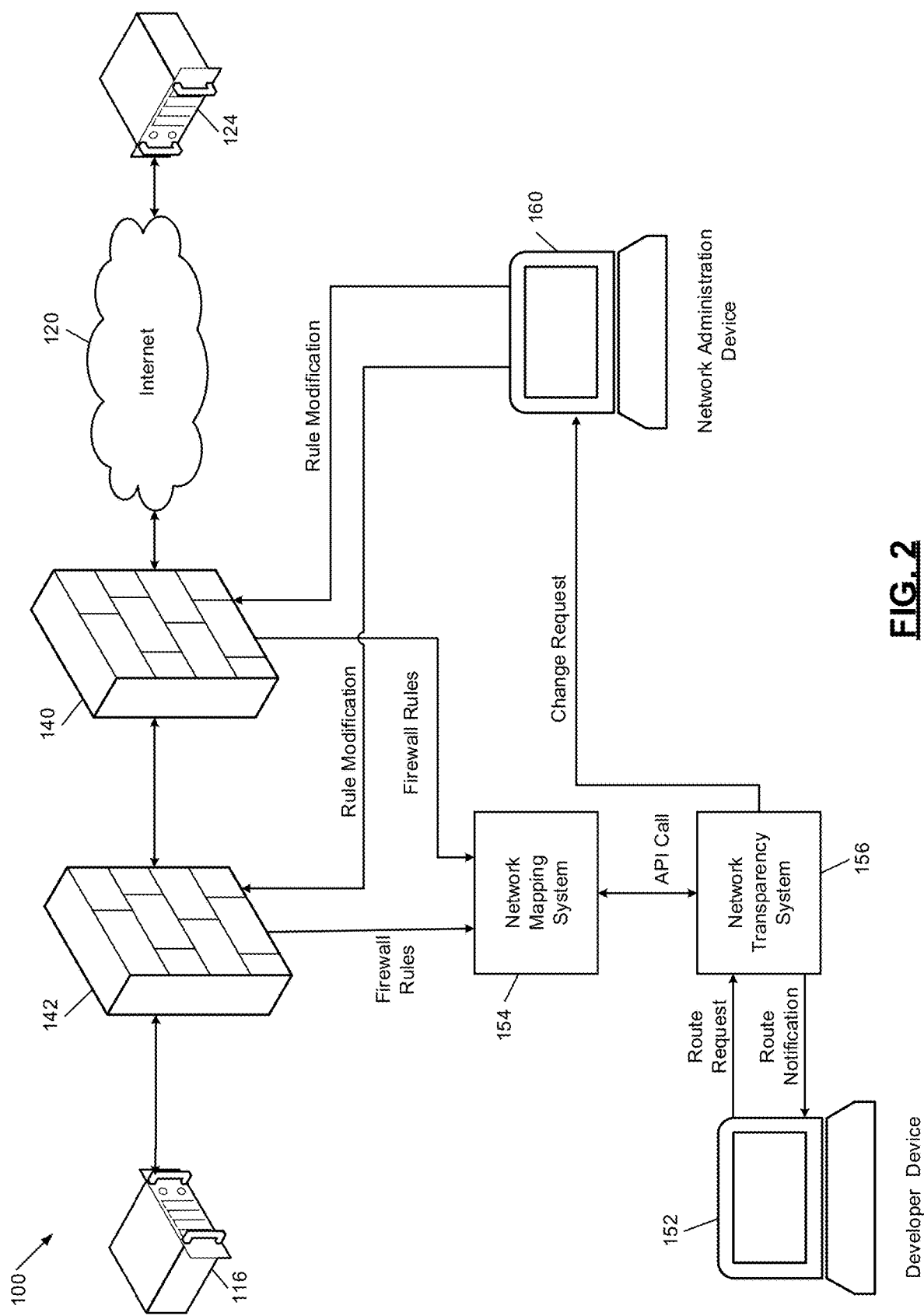
FIG. 2 is a functional block diagram of a subset of the network environment of FIG. 1.

FIG. 2 depicts a subset of the network environment 100 in an example situation where the developer plans for the servers 116 and 124 to communicate with each other as part of a new application or feature. Using the developer device 152, the developer submits a route request to the network transparency system 156. The route request may specify the server 116 as the source, the server 124 as the destination, and a set of traffic parameters. Each of the source and destination may be specified as a domain name (which may, in some implementations, be a fully qualified domain name), a single IP address, an IP range, which may be specified using classless inter-domain routing (CIDR), etc.

The traffic parameters of the route request may include, for example, a port number and a protocol selection. For example, the protocol selection may include transmission control protocol (TCP), user datagram protocol (UDP), encapsulating security payload (ESP), generic routing encapsulation (GRE), etc. The traffic parameters may also include a specification of the application according to the application layer of TCP/IP or layer 7 of the open systems interconnect (OSI) model. In various implementations, the traffic parameters may include two or more of port number, protocol, and application name.

The developer device 152 may supply the route request to the network transparency system 156 via an application programming interface (API) call. In various implementations, the network transparency system 156 may present an interactive user interface, such as a web portal, to the developer device 152. In such implementations, the developer can use a web browser on the developer device 152 to access the web portal hosted by the network transparency system 156. In various implementations, the web hosting may be handled by a web server that is distinct (such as on a different physical or virtual server) from the back-end network analysis performed by the network transparency system 156.

Based on a received route request, the network transparency system 156 requests related data from the network mapping system 154. For example, the network transparency system 156 may submit a pair of endpoints to the network mapping system 154 using an API call. In return, the network mapping system 154 may provide raw network configuration data regarding the route between the pair of endpoints. The network data may also include firewall rules, routing tables, network paths, firewall zones, firewall network address translation (NAT) policies, access control lists (ACLs), and other network data indicative of the network configuration for the distributed communications system 108.

Additionally or alternatively, the network mapping system 154 may provide more particular information, such as which (if any) networking devices may prevent the desired traffic. In some situations, there may be multiple paths for the traffic to take through the distributed communications system 108. If the traffic is blocked along any of those paths, the restrictive networking devices are included as requiring reconfiguration.

As an example only, data from the network mapping system 154 has identified the firewalls 140 and 142 as being positioned along the route between the servers 116 and 124, so the firewalls 140 and 142 are shown in FIG. 2. As shown in FIG. 2, the configuration data (such as firewall rules) for the firewalls 140 and 142 may be obtained by the network mapping system 154. The configuration data may be pushed to the network mapping system 154 by the firewalls 140 and 142 whenever a change is made to their configuration data. Additionally or alternatively, the network mapping system 154 may pull the configuration data on a periodic schedule or after notification that a change has been made to the system.

The network transparency system 156 may be configured to generate a change request and submit the change request to the network administration device 160. The change request is a request for the network administration device 160 to modify existing firewall rules or router ACLs so that network traffic is allowed to flow between the source and the destination of the route request. For example, the change request may be a request for the network administration device 160 to modify a single firewall rule for the firewall 142. Alternatively, the change request may include a request to modify a list of firewall rules and/or router ACLs.

In response to receiving the change request, the network administration device 160 investigates and selectively modifies the relevant firewall rule. In various implementations, a network engineer may be required to review and approve some or all requests. If the firewall 142 is configured to deny all traffic by default, the network administration device 160 may generate a rule that permits the traffic needed by the developer. For example, the rule added by the network administration device 160 may include a source IP address, a destination IP address, and a port number. If the firewall 142 is configured to allow all traffic by default, the network administration device 160 may modify the rule of the firewall 142 that is blocking the desired traffic.

Figure 3:
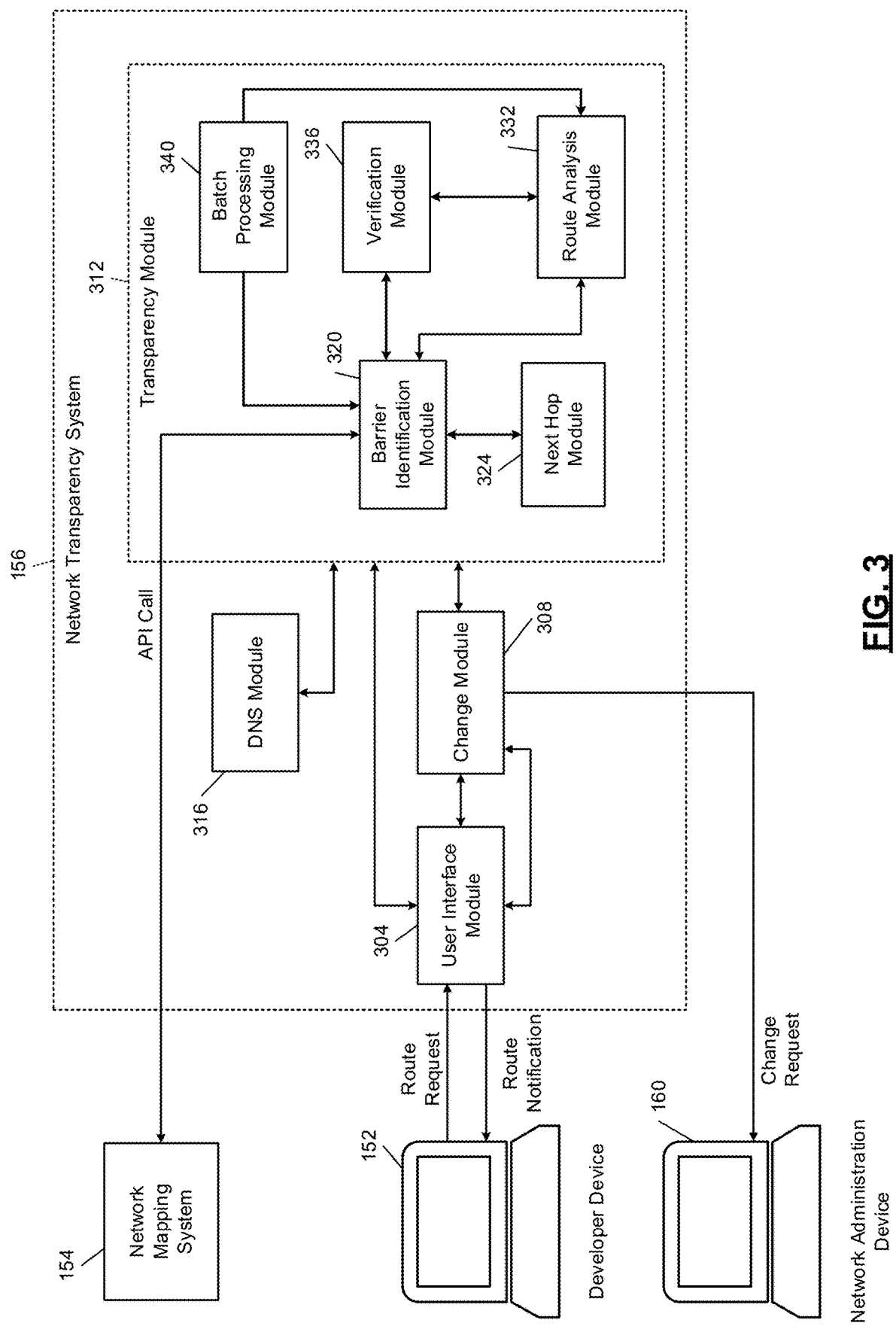
FIG. 3 is a functional block diagram of an example network transparency system.

FIG. 3 is a functional block diagram of an example implementation of the network transparency system 156. The network transparency system 156 includes a user interface module 304, a change module 308, a transparency module 312, and a DNS module 316. The user interface module 304 presents a user interface to the developer at the developer device 152. The developer provides input to the user interface module 304 indicating desired network traffic. The user input may be described as a route request. For example, the route request includes a source, a destination, a port number, and a protocol selection (such as UDP or TCP).

The transparency module 312 includes a barrier identification module 320, a next hop module 324, a route analysis module 332, a verification module 336 and a batch processing module 340. In the event that an address in a route request is supplied as a domain name, the DNS module 316 translates the domain name into one or more IP addresses.

In response to receiving the route request from the user interface module 304, the barrier identification module 320 obtains network mapping data (such as by making an API call to the network mapping system 154) indicating a set of one or more routes permitted for the traffic specified by the route request.

The barrier identification module 320 determines whether any nodes along the set of routes is a potential barrier. In various implementations, every middlebox is considered to be a potential barrier. For example, the barrier identification module 320 may identify every firewall and every router with an ACL as a potential barrier. The barrier identification module 320 may identify a firewall based on the device name or other indicia. For example, according to a system-wide naming convention, the characters "FW" in the name of the node may indicate that the node is a firewall.

The barrier identification module 320 may determine whether a node performs network address translation (NAT). If NAT is performed, the barrier identification module 320 may record parameters about how the NAT is performed and continue to find a path toward the NAT'd destination. Further, upon user request, the barrier identification module 320 may automatically identify potential barriers for traffic in the reverse direction.

The next hop module 324 identifies a list of next hops for traffic at each node based on the network mapping data. A next hop represents a next possible network node to which a packet can be sent along a route. The barrier identification module 320 may assess every next hop for whether it represents a potential barrier. The barrier identification module 320 assembles a list of potential barriers and provides the list to the route analysis module 332.

The route analysis module 332 determines whether the desired traffic is allowed at each potential barrier in the barrier list. For entry in the barrier list, the route analysis module 332 determines whether traffic is allowed to flow between the source and the destination of the route request according to the configuration of the node. If the node prevents traffic between the source and the destination of the route request, the route analysis module 332 flags the node as an impediment.

When none of the nodes in the barrier list prevent traffic between the source and destination of the route request, the route analysis module 332 determines that that desired traffic is permitted. Based on the configuration data, the network mapping system 154 may make an independent determination of whether the traffic will be allowed. Once a determination is made for whether or not traffic is allowed to flow between the source and the destination of the route request, the verification module 336 may determine whether the determined result matches a conclusion made by the network mapping system 154 for the route request. If the network mapping system 154 has reached a different conclusion, the network administration device 160 may be notified to investigate and resolve this discrepancy.

When there is a single route request, the user interface module 304 may display the result of the route request on the developer device 152. For example, when traffic is allowed between the source and the destination, the user interface module 304 may simply indicate the allowance. When traffic is not allowed between the source and the destination, the user interface module 304 may indicate the impediment along with the barrier list.

The developer may instruct the change module 308 to generate a change request based on the identified impediments. The change request represents an access request or change request that is transmitted to the network administration device 160 for processing. The network administration device 160 will either deny the change request or make the appropriate modifications to the middleboxes to satisfy the change request. The network administration device 160 may then notify the developer device 152 and/or the network transparency system 156 of the action taken (or not taken). In various implementations, the transparency module 312 may directly provide the list of impediments to the change module 308 to automate the creation of one or more change requests.

In some implementations, the change module 308 may include with the change request additional information regarding the networking devices 150 and the router 144. For example, the change module 308 may include relevant firewall rules, firewall zones used by the firewalls, network address translation (NAT) policies implemented by the networking devices 150 in the change request.

In various implementations, the developer device 152 may be permitted to provide a batch of route requests. The user interface module 304 may be configured to permit user input of multiple requested routes. Additionally or alternatively, the user interface module 304 may be configured to accept an attachment including a list of route requests. In other implementations, a list of route requests may be provided to the transparency module 312 directly, such as through an API.

The batch processing module 340 coordinates analysis of multiple route requests. For example, if the multiple requests include the same endpoints but multiple ports, the operation of the barrier identification module 320 and the next hop module 324 may be largely unchanged, but the route analysis module 332 will need to assess each entry in the barrier list with respect to each of the ports. Meanwhile, if the request are for a single type of traffic but between different sets of endpoints, the batch processing module 340 may iterate through each pair of endpoints, without otherwise changing the operation of the barrier identification module 320 and the route analysis module 332. Performance optimizations may be made so that similar routes (which may share many or even all intermediate nodes) do not have to be analyzed completely separately.

Figure 4A:
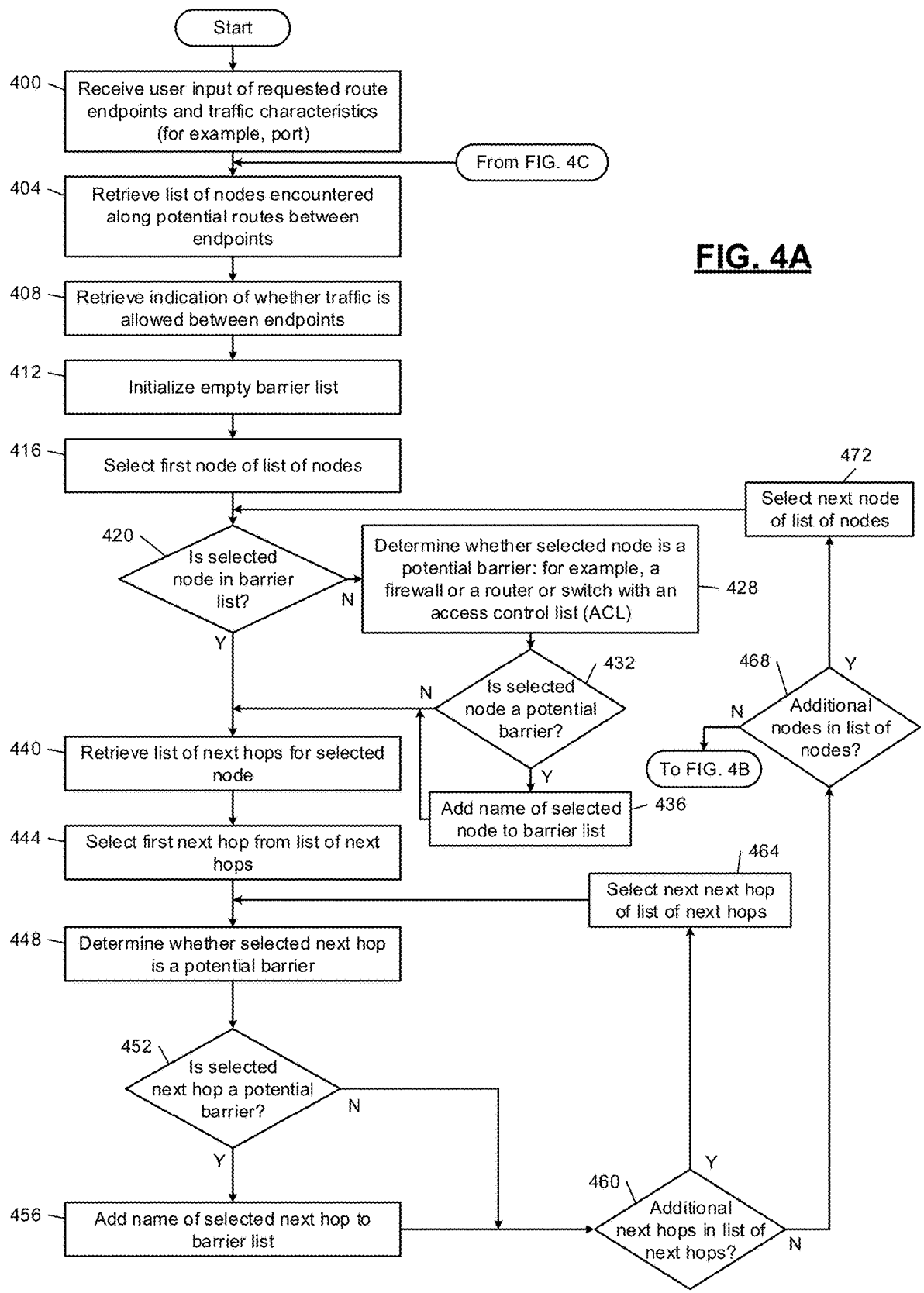
FIGS. 4A-4C together form a flowchart of example operation of a network transparency system according to the principles of the present disclosure.
Figure 4B:
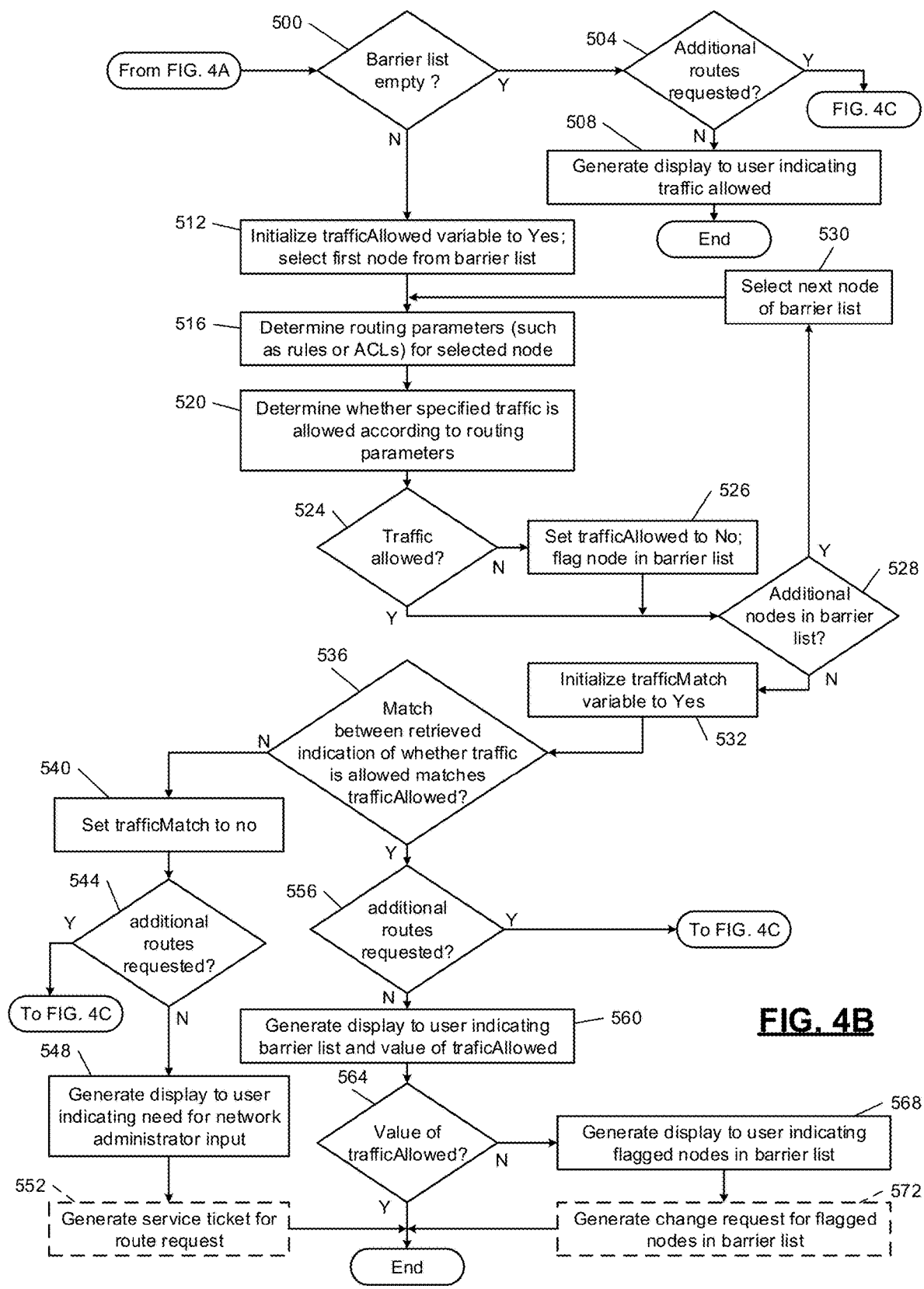
Figure 4C:
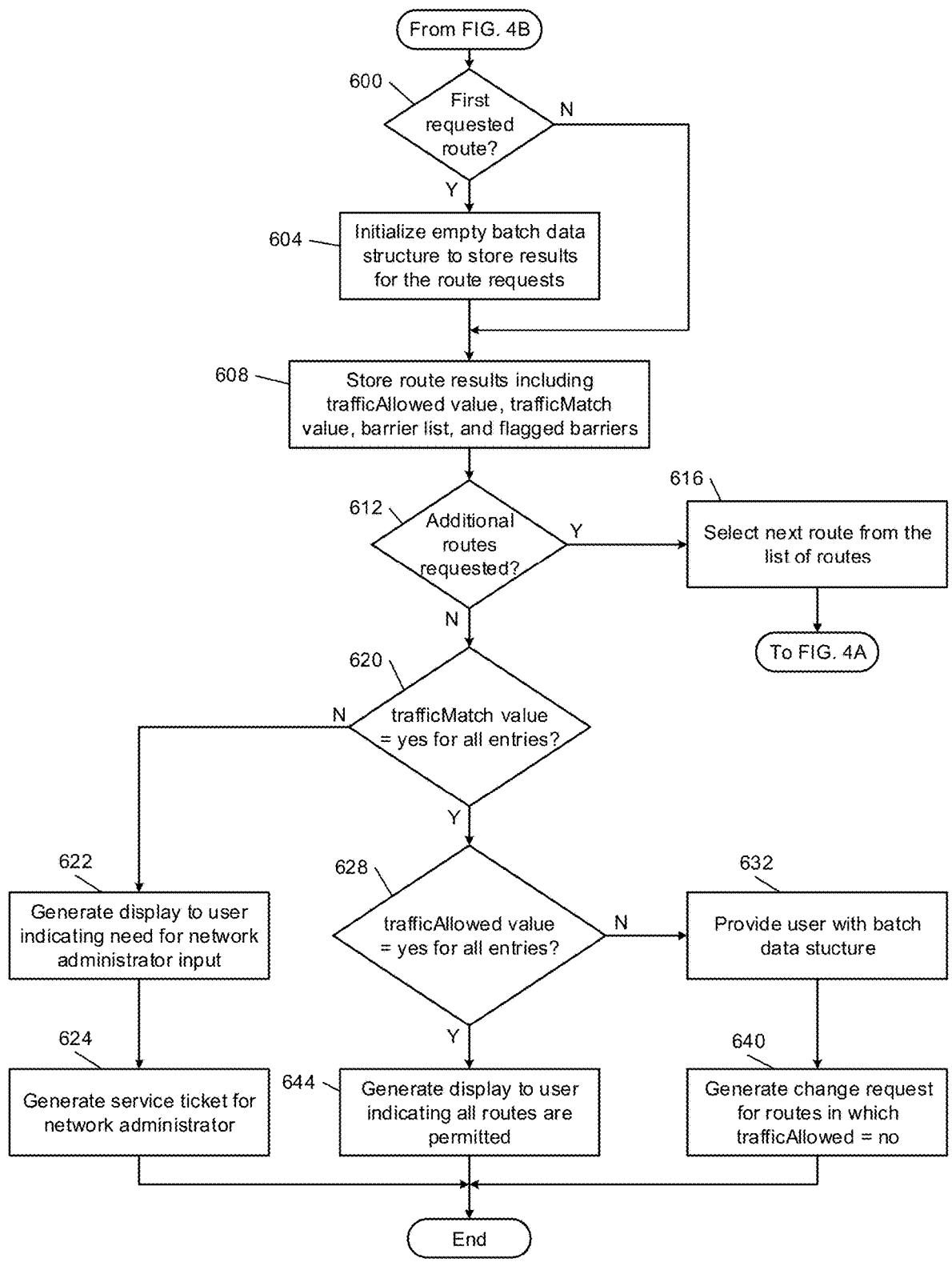

In FIGS. 4A-4C, example control of the network transparency system begins at 400. At 400, control receives user input of a route request, which may specify endpoints and traffic characteristics. The endpoints include a source address and a destination address for desired traffic. The traffic characteristics may include a destination port number and a selection of a data transfer protocol (for example, TCP or UDP). While not depicted in FIG. 4A for brevity, the user may specify multiple routes and/or multiple different types of traffic. If so, the following operations in FIG. 4A may initially be performed on the first route and type of traffic.

At 404, control retrieves a list of nodes encountered along potential routes between the endpoints (that is, the source and the destination). While omitted from FIG. 4A for brevity, control may first verify that there is at least one potential route. If there is no route from the source address to the destination address, network administrator intervention may be needed. In such a case, the lack of a route may be indicated to the user—the user may have mistyped one of the parameters—and control ends.

At 408, control retrieves an indication of whether the specified traffic is allowed between the endpoints. The indication may be provided by a network mapping system that also provides the list of nodes. At 412, control initializes an empty barrier list. At 416, control selects a first node of the retrieved list of nodes between the endpoints. At 420, control determines whether the selected node has already been added to the barrier list. If so, control continues at 440; otherwise, control continues at 428.

Figure 5:
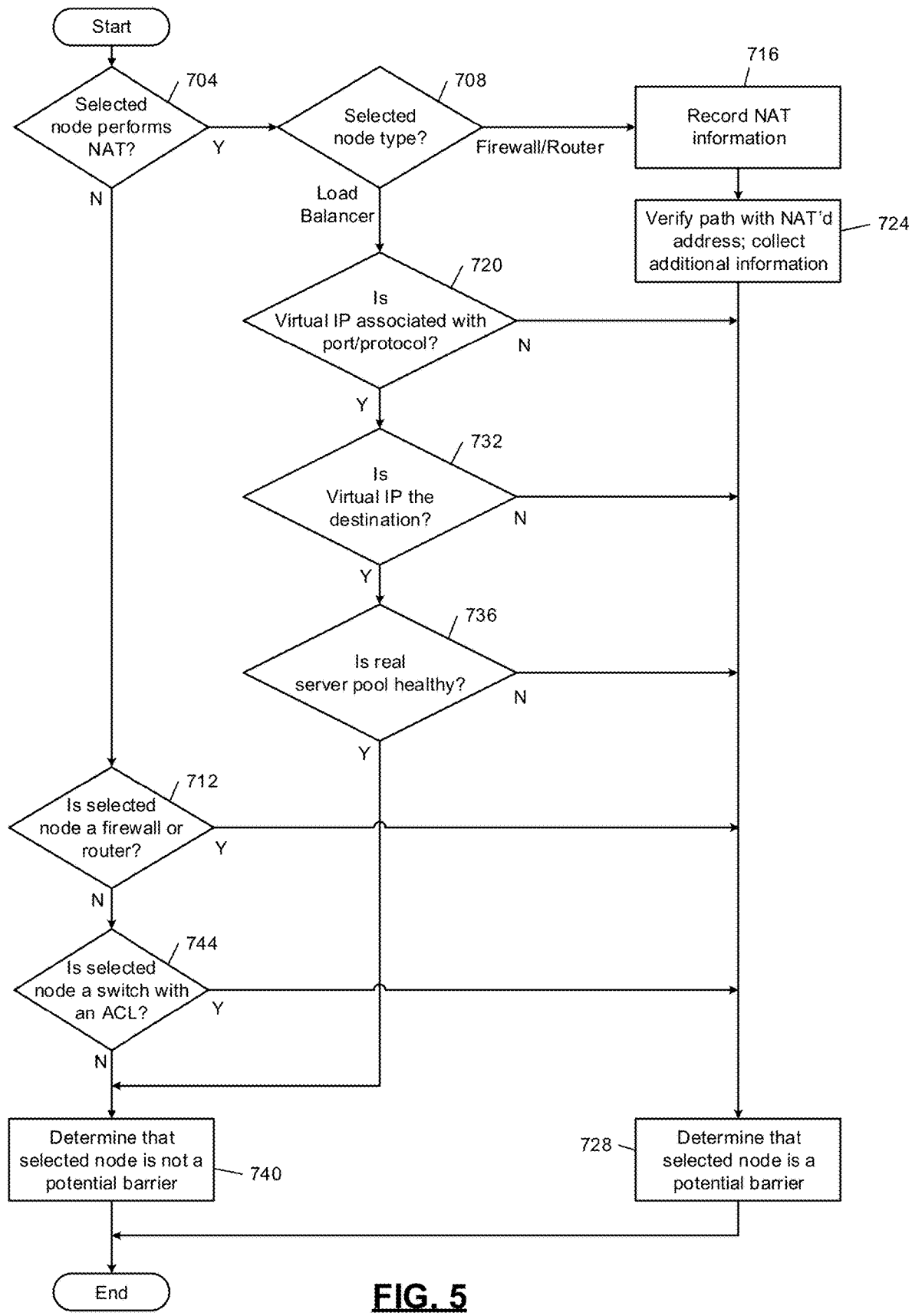
FIG. 5 is a flowchart of example operation of determining whether a node is a potential barrier.

At 428, control determines whether the selected node is a potential barrier between the endpoints of the requested route (for example, using the operation described in FIG. 5). If so, control continues at 432; otherwise, control continues at 440. At 432, control determines whether the selected node is a potential barrier. If so, control continues at 436; otherwise, control continues at 440. Potential barriers include firewalls and a router or a switch with an access control list (ACL). As described above, a node may be characterized as a firewall or ACL router based on a naming convention for networking devices. At 436, the selected node is added to the barrier list. At 440, control retrieves a list of next hops for the selected node.

At 444, control selects a first next hop from the list of next hops. At 448, control determines whether the selected next hop is a potential barrier (for example, using the operation described in FIG. 5). At 452, if control has determined that the selected next hop is a potential barrier, control continues at 456; otherwise, control continues at 460. For example, control determines that the next hop is a potential barrier when the next hop is a firewall, a router and/or a switch with an ACL. At 456, control adds the selected next hop to the barrier list.

At 460, control determines whether there are additional next hops in the list of next hops. If so, control continues at 464; otherwise, control continues at 468. At 464, control selects the next hop from the list of next hops and control continues back at 448. At 468, control determines whether there are additional nodes in the list of nodes. If so, control continues at 472; otherwise, control continues to FIG. 4B. At 472, control selects the next node from the list of nodes and control continues back at 420.

At 500 of FIG. 4B, control determines whether the barrier list is empty. If so, control continues at 504; otherwise, control continues at 512. At 504, control determines whether additional routes have been requested by the user. If not, control continues at 508; otherwise, control continues at 600 in FIG. 4C. At 508, control generates a display to the user indicating that traffic is allowed since there are no potential barriers that would prevent traffic between the source and the destination of the route request.

At 512, control initializes a variable named trafficAllowed to yes and selects a first node from the barrier list. At 516, control determines routing parameters for the selected node. Routing parameters may include firewall rules or router ACLs that limit inbound and outbound traffic for the selected node.

At 520, control determines whether the specified traffic is allowed for the selected node according to the routing parameters. At 524, if control determines that traffic is allowed, control continues at 528; otherwise, control continues at 526. At 526, control sets the trafficAllowed variable to no and flags the selected node in the barrier list. At 528, control determines whether there are additional nodes in the barrier list. If so, control continues at 530; otherwise, control continues at 532. At 530, control selects the next node of the barrier list and control continues back at 516.

At 532, control initializes a variable called trafficMatch to yes. At 536, control determines whether there is a match between a retrieved indication of whether traffic is allowed and the trafficAllowed variable. If so, control continues at 556; otherwise, control continues at 540. At 540, control sets trafficMatch to no. At 544, control determines whether there are additional route requests. If so, control continues at 600 in FIG. 4C; otherwise, control continues at 548. At 548, control generates a display to the user indicating the need for network administrator input. At 552, control optionally generates a service ticket for the route request and control may end.

At 556, control determines whether there are additional routes requests. If so, control continues at 600 in FIG. 4C; otherwise, control continues at 560. At 560, control generates a display to the user indicating the barrier list along with the value of trafficAllowed. At 564, control determines the value of trafficAllowed. If the value of traffic allowed is yes, control may end; otherwise, control continues at 568. At 568, control generates a display to the user indicating the flagged nodes in the barrier list. At 572 control optionally generates a change request for the flagged nodes in the barrier list.

At 600 in FIG. 4C, control determines whether this is the first route request of a batch of routes provided by the user. If so, control continues at 604; otherwise, control continues at 608. At 604, control initializes an empty data structure to store the results of the route requests. At 608, control stores the route results including the trafficAllowed value, trafficMatch value, the barrier list, and any flagged barriers. At

612, control determines whether there are additional route requests. If so, control continues at 616; otherwise, control continues at 620. At 616, control selects the next route from the list of routes and returns to 404 of FIG. 4A.

At 620, control determines whether the trafficMatch value for all routes entries is equal to yes. If so, control continues at 628; otherwise, control continues at 622. At 622, control generates a display to the user indicating the need for network administrator input. At 624, control generates a service ticket for the network administrator to resolve the discrepancy. Control may also display the need for network administrator intervention. Control then ends. At 628, control determines whether the trafficAllowed value is yes for all route entries. If so, control continues at 644; otherwise, control continues at 632.

At 632, control outputs some or all of the batch data structure to the user, indicating routes and which impediments are identified along the routes. At 640, control generates one or more change requests for route requests in which the trafficAllowed value equals no. Control may also display the change requests, and may solicit user approval before submission to the network administrator. Control then ends. At 644, control generates a display to the user indicating all routes are permitted. Control then ends.

FIG. 5 is invoked to determine whether a network device (also called a node) should be included in the list of potential barriers. Control begins at 704, where control determines whether the selected node performs network address translation (NAT). If so, control transfers to 708; otherwise, control transfers to 712. At 708, control transfers to 716 if the selected node is a firewall or router. At 708, control transfers to 720 if the selected node is a load balancer.

At 716, control records NAT information and proceeds to 724. At 724, control verifies the desired traffic's path to the destination with NAT'd addresses. Control also collects additional information about the selected node. Control then continues at 728, where control makes a determination that the selected node is a potential barrier. Control then ends.

At 720, control determines whether the Virtual IP (VIP) of the load balancer is associated with the port number and protocol specified by the query. If so, control continues at 732; otherwise, control transfers to 728. At 732, control determines whether the VIP is the destination of the desired traffic. If so, control continues to 736; otherwise, control transfers to 728. At 736, control determines whether the real server pool associated with the load balancer is healthy. If so, control transfers to 740; otherwise, control transfers to 728.

At 712, control determines whether the selected node is a firewall or router. If so, control transfers to 728. If the selected node is neither a firewall nor a router, control transfers to 744. At 744, control determines whether the selected node is a switch with an active access control list (ACL). If so, control transfers to 728; otherwise, control transfers to 740. At 740, control makes a determination that the selected node is not a potential barrier and control ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A network configuration apparatus comprising:
   a user interface module configured to receive a traffic request from a user, wherein the traffic request includes a source and a destination for desired traffic;
   a barrier identification module configured to:
      obtain network data indicating a set of networking devices present in a route between the source and the destination;
      create an empty barrier list; and
      for each device of the set of networking devices:
         determine whether the device is a potential barrier to traffic traversing from the source to the destination; and
         in response to a determination that the device is a potential barrier, add the device to the barrier list; and
   a route analysis module configured to, for each device in the barrier list:
      evaluate whether the device will block the desired traffic from reaching the destination; and
      in response to an evaluation that the device will block the desired traffic, flag the device,
   wherein the user interface module is configured to:
      in response to there being at least one flagged device, transmit an alert to the user that the traffic request is a failure; and
      in response to there being zero flagged devices, transmit an alert to the user that the traffic request is a success.

2. The network configuration apparatus of claim 1 further comprising a change module configured to, in response to there being at least one flagged device, generate a change request specifying at least one of the at least one flagged device.

3. The network configuration apparatus of claim 2 wherein the change module is configured to, in response to generation of the change request, automatically transmit the change request to a network administrator.

4. The network configuration apparatus of claim 2 wherein generating the change request for multiple flagged devices includes one of:
generating an individual change request for each of the flagged devices; and
generating a single change request specifying all of the flagged devices.

5. The network configuration apparatus of claim 1 wherein:
the network data includes, for a first device of the set of networking devices, a name of the first device; and
the barrier identification module is configured to determine that the first device may block traffic from reaching the destination based on the name of the first device.

6. The network configuration apparatus of claim 1 wherein:
the network data includes, for a first device of the set of networking devices, a ruleset;
the route analysis module is configured to determine whether the first device will block the desired traffic from reaching the destination by evaluating the ruleset with respect to parameters of the desired traffic; and
the parameters of the desired traffic include the destination.

7. The network configuration apparatus of claim 6 wherein the parameters of the desired traffic include two or more of (i) a port number, (ii) a protocol selection, and (iii) an application name.

8. The network configuration apparatus of claim 1 wherein:
the barrier identification module is configured to obtain the network data from a network monitoring system; and
the network data also includes a determination by the network monitoring system of whether the desired traffic is permitted between the source and the destination.

9. The network configuration apparatus of claim 8 wherein:
the determination from the network monitoring system includes either (i) a success value indicating that the desired traffic is permitted between the source and the destination or (ii) a failure value indicating that the desired traffic is blocked by at least one of the set of networking devices; and
the user interface module is configured to:
in response to the determination including the success value but there being at least one flagged device, transmit an alert to the user that a discrepancy has been identified with respect to the traffic request; and
in response to the determination including the failure value but there being zero flagged devices, transmit an alert to the user that a discrepancy has been identified with respect to the traffic request.

10. The network configuration apparatus of claim 1 wherein:
the traffic request specifies traffic parameters; and
the traffic parameters include at least two of (i) a port number, (ii) a protocol selection, and (iii) an application name.

11. The network configuration apparatus of claim 1 wherein the traffic request includes at least one source, at least one destination, at least one port number, and at least one protocol selection.

12. The network configuration apparatus of claim 1 wherein the barrier identification module is configured to, for each device of the set of network devices:
determine whether the device is configured to perform network address translation (NAT) on the desired traffic; and
if so, add the device to the barrier list.

13. The network configuration apparatus of claim 1 wherein:
the user interface module is configured to receive a plurality of traffic requests; and
the route analysis module is configured to make a determination for each of the plurality of traffic requests as to whether traffic is permitted.

14. A method comprising:
receiving a traffic request from a user, wherein the traffic request includes a source and a destination for desired traffic;
obtaining network data indicating a set of networking devices present in a route between the source and the destination;
creating an empty barrier list;
determining, for each device of the set of networking devices, whether the device is a potential barrier to traffic traversing from the source to the destination;
in response to a determination that the device is a potential barrier to traffic, adding the device to the barrier list;
evaluating, for each device in the barrier list, whether the device will block the desired traffic from reaching the destination;
in response to an evaluation that the device will block the desired traffic, flag the device;
in response to there being at least one flagged device, transmitting an alert to the user that the traffic request is a failure; and
in response to there being zero flagged devices, transmitting an alert to the user that the traffic request is a success.

15. The method of claim 14 further comprising, in response to there being at least one flagged device:
generating a change request specifying at least one of the at least one flagged device; and
transmitting the change request to a network administrator,
wherein generating the change request for multiple flagged devices includes one of:
generating an individual change request for each of the flagged devices, and
generating a single change request specifying all of the flagged devices.

16. The method of claim 14 wherein:
the network data includes, for a first device of the set of networking devices, a ruleset,
the method includes determining whether the first device will block the desired traffic from reaching the destination by evaluating the ruleset with respect to parameters of the desired traffic, and
the parameters of the desired traffic include the destination.

17. The method of claim 14 further comprising:
obtaining the network data from a network monitoring system,
wherein the network data also includes a determination by the network monitoring system of whether the desired traffic is permitted between the source and the destination.

18. The method of claim 17 wherein:
the determination from the network monitoring system includes either (i) a success value indicating that the desired traffic is permitted between the source and the destination or (ii) a failure value indicating that the desired traffic is blocked by at least one of the set of networking devices; and
the method includes:
  in response to the determination including the success value but there being at least one flagged device, transmitting an alert to the user that a discrepancy has been identified with respect to the traffic request; and
  in response to the determination including the failure value but there being zero flagged devices, transmitting an alert to the user that a discrepancy has been identified with respect to the traffic request.

19. The method of claim 14 further comprising, for each device of the set of network devices:
determining whether the device is configured to perform network address translation (NAT) on the desired traffic; and
if so, adding the device to the barrier list.

20. A non-transitory computer-readable medium storing processor-executable instructions, the instructions comprising:
receiving a traffic request from a user, wherein the traffic request includes a source and a destination for desired traffic;
obtaining network data indicating a set of networking devices present in a route between the source and the destination;
creating an empty barrier list;
determining, for each device of the set of networking devices, whether the device is a potential barrier to traffic traversing from the source to the destination;
in response to a determination that the device is a potential barrier to traffic, adding the device to the barrier list;
evaluating, for each device in the barrier list, whether the device will block the desired traffic from reaching the destination;
in response to an evaluation that the device will block the desired traffic, flag the device;
in response to there being at least one flagged device, transmitting an alert to the user that the traffic request is a failure; and
in response to there being zero flagged devices, transmitting an alert to the user that the traffic request is a success.

* * * * *